(12) United States Patent
Imagawa et al.

(10) Patent No.: US 11,796,481 B2
(45) Date of Patent: Oct. 24, 2023

(54) INSPECTION DEVICE AND INSPECTION METHOD

(71) Applicant: Panasonic Intellectual Property Management Co., Ltd., Osaka (JP)

(72) Inventors: Taro Imagawa, Osaka (JP); Hiroya Kusaka, Hyogo (JP); Akihiro Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 715 days.

(21) Appl. No.: 16/996,393

(22) Filed: Aug. 18, 2020

(65) Prior Publication Data
US 2020/0378900 A1 Dec. 3, 2020

Related U.S. Application Data

(63) Continuation of application No. PCT/JP2019/004559, filed on Feb. 8, 2019.

(30) Foreign Application Priority Data

Feb. 22, 2018 (JP) .................. 2018-030189

(51) Int. Cl.
*G01N 21/88* (2006.01)
*G01B 11/30* (2006.01)

(52) U.S. Cl.
CPC ......... *G01N 21/8806* (2013.01); *G01B 11/30* (2013.01); *G01N 21/8851* (2013.01)

(58) Field of Classification Search
CPC ........ G01N 21/00; G01N 21/84; G01N 21/88; G01N 21/8806; G01N 21/8851; G01B 11/00; G01B 11/30
See application file for complete search history.

(56) References Cited

U.S. PATENT DOCUMENTS 10,704,900 B2 * 7/2020 Irie ................... G01B 11/30
2009/0232399 A1 9/2009 Kawahara et al.
(Continued)

FOREIGN PATENT DOCUMENTS

JP 2001-281099 10/2001
JP 2008-8705 1/2008
(Continued)

OTHER PUBLICATIONS

International Search Report (ISR) dated May 14, 2019 in International (PCT) Application No. PCT/JP2019/004559.
(Continued)

*Primary Examiner* — Nguyen Q. Ha
(74) *Attorney, Agent, or Firm* — Wenderoth, Lind & Ponack, L.L.P.

(57) ABSTRACT

An inspection device that inspects a structure with a crack, including: an obtainer that obtains images of the structure captured at mutually different times while the structure is subjected to varying loads; a crack detector that detects a crack on a surface of the structure in each image; a motion estimator that divides each image into blocks having a predetermined size, and derives motion vectors of the blocks based on a positional relation between a position of each block relative to a reference in a first image and a position of each block relative to the reference in a second image, the reference being a tip of the crack detected, the first and second images being included in the images; and an inspector that determines safety of the structure based on a difference between ones of the motion vectors of symmetric positions with respect to the crack.

8 Claims, 11 Drawing Sheets

(56) References Cited

U.S. PATENT DOCUMENTS

| | | | |
|---|---|---|---|
| 2011/0188733 A1 | 8/2011 | Bardos et al. | |
| 2012/0120246 A1 | 5/2012 | Uchima et al. | |
| 2016/0061748 A1 | 3/2016 | Handler | |
| 2018/0292329 A1* | 10/2018 | Karube | G06T 7/0004 |
| 2020/0292411 A1* | 9/2020 | Ohta | G06T 7/001 |

FOREIGN PATENT DOCUMENTS

| | | |
|---|---|---|
| JP | 2008-139285 | 6/2008 |
| JP | 2009-217583 | 9/2009 |
| JP | 2010-265704 | 11/2010 |
| JP | 2010-537434 | 12/2010 |
| JP | 2011-27493 | 2/2011 |
| JP | 2011-123008 | 6/2011 |
| JP | 2012-47571 | 3/2012 |
| JP | 2016-50937 | 4/2016 |
| JP | 2017-11429 | 1/2017 |
| WO | 2009/026661 | 3/2009 |
| WO | 2010/131489 | 11/2010 |

OTHER PUBLICATIONS

Shigemasa Ishii, et al., "Evaluation of behavior during propagation for fatigue crack of CT test piece using PIV", Proceedings of Japan Welding Society, Kyushu-chapter, No. 14, 2017, pp. 35-38 (with English translation).

* cited by examiner

TIME

INSPECTION DEVICE AND INSPECTION METHOD

CROSS REFERENCE TO RELATED APPLICATIONS

This application is a U.S. continuation application of PCT International Patent Application Number PCT/JP2019/004559 filed on Feb. 8, 2019, claiming the benefit of priority of Japanese Patent Application Number 2018-030189 filed on Feb. 22, 2018, the entire contents of which are hereby incorporated by reference.

BACKGROUND

1. Technical Field

The present disclosure relates to an inspection of a structure subjected to varying loads that are externally applied.

2. Description of the Related Art

A structure such as a bridge that is subjected to varying loads due to the passing of a moving object, for example, has an increased risk of collapse with deterioration over time. Stated differently, the safety of the structure degrades with aging. To prevent the collapse of the structure due to deterioration, periodic inspections are required to conduct a necessary repair and reinforcement work.

One such periodic inspection of a structure is an appearance inspection, in which the exterior condition of the structure is assessed to determine, for example, the necessity of repair and reinforcement or the necessity of a detailed inspection.

In general, an appearance inspection of a structure is visually conducted by an inspection crew. Since such visual inspection depends on the subjective view of the inspection crew, it is difficult to obtain an objective inspection result. Consequently, a longer time is consumed for the inspection.

To achieve an automated appearance inspection that provides an objective inspection result, Japanese Unexamined Patent Application Publication No. 2008-139285 discloses the technology of measuring a crack width from an original picture of a structure obtained through a camera.

SUMMARY

However, a crack width is small, and so are its changes over time. It is thus difficult to inspect the structure on the basis of the crack width.

In view of the above, the present disclosure provides an inspection device and an inspection method that reduce the time taken for a structure inspection and improve the inspection accuracy.

The inspection device according to one aspect of the present disclosure is an inspection device that inspects a structure with a crack. Such inspection device includes: an obtainer that obtains a plurality of images of the structure captured at mutually different times while the structure is subjected to varying loads; a crack detector that detects a crack on a surface of the structure included in each of the plurality of images; a motion estimator that divides each of the plurality of images into a plurality of blocks each having a predetermined size, and derives motion vectors of the plurality of blocks based on a positional relation between a position of each of the plurality of blocks relative to a reference in a first image and a position of each of the plurality of blocks relative to the reference in a second image, the reference being a tip of the crack detected, the first image and the second image being included in the plurality of images; and an inspector that determines safety of the structure based on a difference between ones of the motion vectors of symmetric positions with respect to the crack.

Note that these comprehensive or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The inspection device according to an aspect of the present disclosure reduces the time taken for a structure inspection and improves the inspection accuracy.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Overview of the Disclosure

The inspection device according to one aspect of the present disclosure is an inspection device that inspects a structure with a crack. Such inspection device includes: an obtainer that obtains a plurality of images of the structure captured at mutually different times while the structure is subjected to varying loads; a crack detector that detects a crack on a surface of the structure included in each of the plurality of images; a motion estimator that performs local motion estimation on the surface of the structure with respect to a reference to derive motion vectors, the reference being a predetermined position in the crack detected in each of the plurality of images; and an inspector that determines safety of the structure based on a difference between ones of the motion vectors of symmetric positions with respect to the crack.

Such inspection device is capable of determining the structure's safety on the basis of the difference between the motion vectors of the symmetric positions with respect to the crack. The extension of a crack depends on the stress applied around the crack, especially the stress applied on the crack. The determination of the structure's safety on the basis of the difference between the motion vectors of the symmetric positions with respect to the crack enables a more accurate determination of degradation in the structure's safety caused by crack extension, thus improving the inspection accuracy. Also, the inspection device is further capable of determining the structure's safety from images, which eliminates the necessity of a visual inspection and thus reduces the time taken for the inspection.

Also, in the inspection device according to one aspect of the present disclosure, the inspector may calculate a direction of the crack and determine, as the symmetric positions with respect to the crack, line-symmetric positions with respect to a line that extends along the crack in the direction of the crack calculated.

Such inspection device is capable of determining, as the symmetric positions with respect to the crack, positions that are line-symmetric with respect to the line that extends along the crack in the calculated direction of the crack. This enables the difference between the motion vectors of the positions that face each other across the crack in the direction perpendicular to the crack to be used for safety determination. Consequently, a more accurate determination is achieved on degradation in the structure's safety caused by crack extension.

Also, in the inspection device according to one aspect of the present disclosure, the inspector may estimate a variation in a width of the crack based on the difference between the ones of the motion vectors, and determine the safety of the structure based on the variation in the width estimated.

Such inspection device is capable of determining the structure's safety on the basis of the estimated variation in the width of the crack. The variation in the width of the crack while the structure is subjected to varying loads greatly influences the extension of the crack, although such variation is small. However, such smallness makes it difficult for the variation to be derived directly from images. In view of this, the use of a variation in the width of the crack that has been estimated on the basis of the difference between the motion vectors of the symmetric positions with respect to the crack enables more accurate prediction of crack extension, thus improving the accuracy of inspecting the structure.

Also, the inspection device according to one aspect of the present disclosure may further include an extractor that performs a principal component analysis on the motion vectors derived to extract a plurality of principal components from the motion vectors, and the inspector may determine the safety of the structure, using the plurality of principal components extracted, excluding at least one bottom principal component in descending order of eigenvalue.

Such inspection device is capable of determining the structure's safety, using the principal components, excluding at least one bottom principal component in descending order of eigenvalue. The inspection device is thus capable of removing noise components from the motion vectors and thus further improving the accuracy of inspecting the structure.

Also, in the inspection device according to one aspect of the present disclosure, the obtainer may further obtain a reference image captured temporally before the plurality of images, the crack detector may further detect a crack on the surface of the structure included in the reference image, and the inspector may further determine the safety of the structure based on a variation in the crack between the reference image and one of the plurality of images.

Such inspection device is capable of determining the structure's safety on the basis of a variation in the crack between the reference image captured before the plurality of images and one of the plurality of images, in addition to the difference between the motion vectors. Consequently, the inspection device achieves more accurate prediction of crack extension, thus improving the accuracy of inspecting the structure.

Also, the inspection device according to one aspect of the present disclosure may further include an image sensor that captures the plurality of images.

Such inspection device including the image sensor achieves a simple inspection of the structure.

Also, in the inspection device according to one aspect of the present disclosure, the predetermined position may be a tip.

Such inspection device is capable of performing local motion estimation on the surface of the structure with the tip of the crack serving as a reference. This enables the use of a characteristic position near the crack as a reference, thus achieving a more precise estimation of motion around the crack.

Note that these comprehensive or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following specifically describes the embodiments with reference to the drawings.

Note that the following embodiments show a comprehensive or specific illustration of the present disclosure. The numerical values, shapes, materials, structural components, the arrangement and connection of the structural components, steps, the processing order of the steps, etc. shown in the following embodiments are mere examples, and thus are not intended to limit Claims. Of the structural components described in the following embodiments, structural components not recited in any one of the independent claims that indicate the broadest concepts of the present disclosure will be described as optional structural components. Also note that the drawings are not necessarily precise illustrations. In the drawings, substantially the same components are assigned the same reference numbers and their repetitive descriptions will be omitted or simplified.

Embodiment 1

[Structure of Inspection System]

Figure 1:
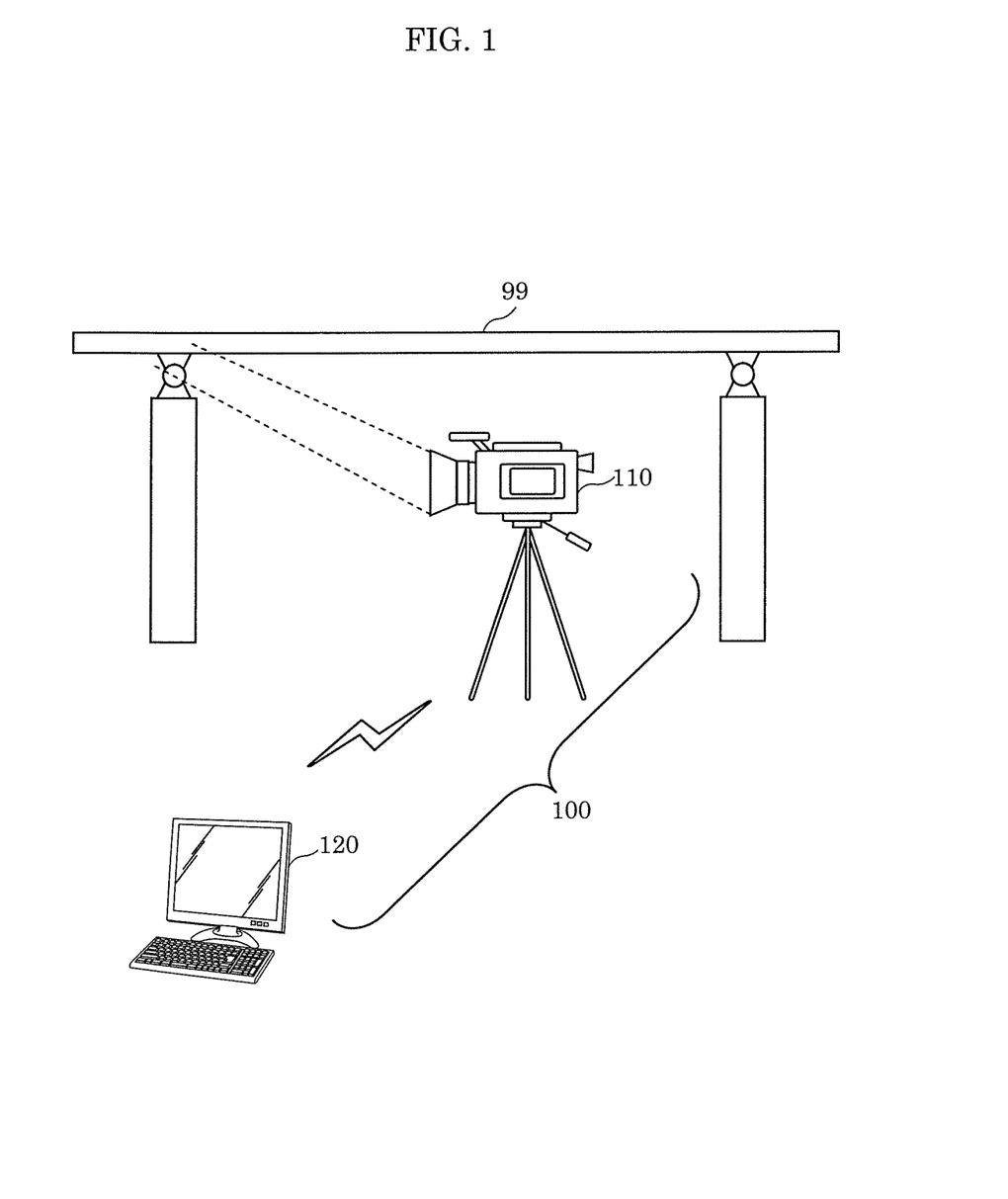
FIG. 1 is an external view of an exemplary structure of an inspection system according to Embodiment 1.

With reference to FIG. 1, the following specifically describes an exemplary structure of an inspection system according to Embodiment 1. FIG. 1 is an external view of an exemplary structure of the inspection system according to Embodiment 1. Inspection system 100 includes imaging device 110 and inspection device 120.

Imaging device 110 is, for example, a digital video camera or a digital still camera that includes an image sensor. Imaging device 110 captures images of structure 99 over time. More specifically, imaging device 110 captures a plurality of images of structure 99 while structure 99 is subjected to varying loads. When structure 99 is a railroad bridge, for example, imaging device 110 captures a plurality of images of the railroad bridge over which a train is passing.

Such plurality of images are images of an identical portion of structure 99 captured at mutually different times. More specific examples of the plurality of images include a plurality of frames included in video. The portion of structure 99 is, for example, a portion having a crack on its surface.

Inspection device 120, an example of which is a computer, includes a processor (not illustrated) and a memory (not illustrated) that stores a software program or instructions. Inspection device 120 achieves its functions described below by the processor executing the software program. Alternatively, inspection device 120 may be implemented as a dedicated electronic circuit (not illustrated). In this case, the functions of inspection device 120 described below may be implemented by individual electronic circuits or as a single integrated electronic circuit.

Inspection device 120 is connected to imaging device 110 to be able to communicate with imaging device 110, and inspects structure 99 on the basis of the plurality of images captured by imaging device 110. In the present embodiment, "to inspect structure 99" means to assess the crack on the surface of structure 99 and determine the safety or the risk of structure 99. More specific examples of the safety or risk determination include: the determination of whether a detailed inspection of the surrounding area of the crack is necessary; the readjustment of the timing and intervals of future monitoring; and the determination of whether a repair work is necessary.

[Functional Structure of Inspection Device]

Figure 2:
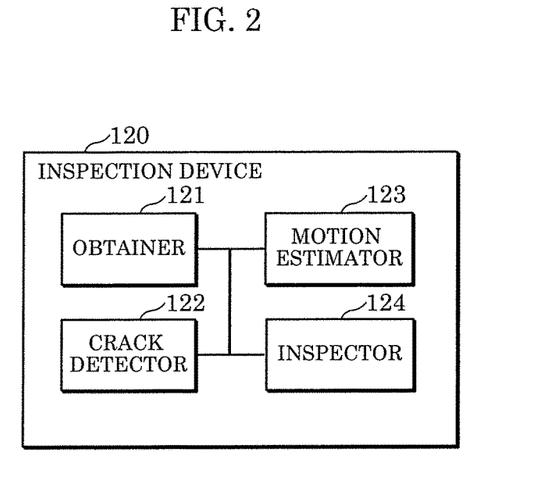
FIG. 2 is a block diagram of the functional structure of an inspection device according to Embodiment 1.

With reference to FIG. 2, the following describes the functional structure of inspection device 120 according to Embodiment 1. FIG. 2 is a block diagram of the functional structure of inspection device 120 according to Embodiment 1. As shown in FIG. 2, inspection device 120 includes obtainer 121, crack detector 122, motion estimator 123, and inspector 124.

Obtainer 121 obtains a plurality of images of structure 99 captured at mutually different times while structure 99 is subjected to varying loads. For example, obtainer 121 obtains the plurality of images from imaging device 110 by wireless communication. Alternatively, obtainer 121 may obtain the plurality of images from imaging device 110 via, for example, a detachable memory such as a universal serial bus (USB) memory.

Crack detector 122 detects a crack on the surface of structure 99 included in each of the plurality of images. Example methods of crack inspection include, but not limited to, edge detection.

Motion estimator 123 derives motion vectors of each of the plurality of images by performing local motion estimation on the surface of structure 99, with the tip of the detected crack serving as a reference. Example methods of motion estimation include, but not limited to, block matching.

In this case, for example, motion estimator 123 divides each of the images into blocks, each having a predetermined size (e.g., 8 by 8 pixels, 16 by 16 pixels). Motion estimator 123 then searches for a block similar to each of the blocks in an image that is temporally adjacent to the image that includes such each block. The following description refers to such each block as a current block and a block similar to the current block as a similar block. The following description also refers to the image that includes the current block as a current image and an image that is temporally adjacent to the current image as an adjacent image.

Motion estimator 123 derives a motion vector of the current block on the basis of a positional relation between the position of the current block relative to the tip of the crack in the current image and the position of the similar block relative to the tip of the crack in the adjacent image. Note that a reference image used to calculate motion vectors is not limited to an adjacent image, and thus an image not adjacent to the current image may be used as a reference image.

Inspector 124 determines the structure's safety on the basis of the difference between the motion vectors of symmetric positions with respect to the crack. "Symmetric positions with respect to the crack" refers to positions that are spatially symmetric with respect to the crack. Its specific example will be described later with reference to the drawings.

[Processes of Inspection Device]

The following describes the processes performed by inspection device 120 with the above structure.

[Overview of Inspection Processes]

Figure 3:
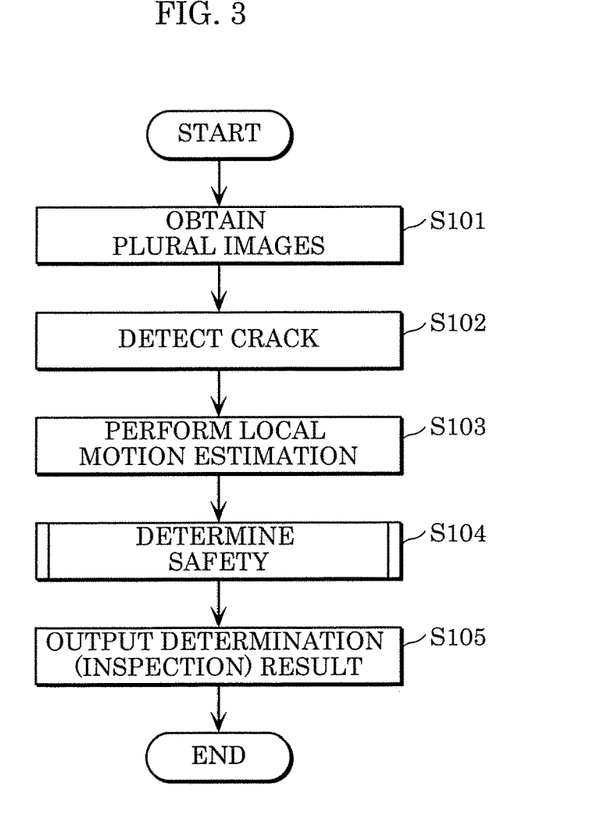
FIG. 3 is a flowchart showing an overview of processes performed by the inspection device according to Embodiment 1.
Figure 4:
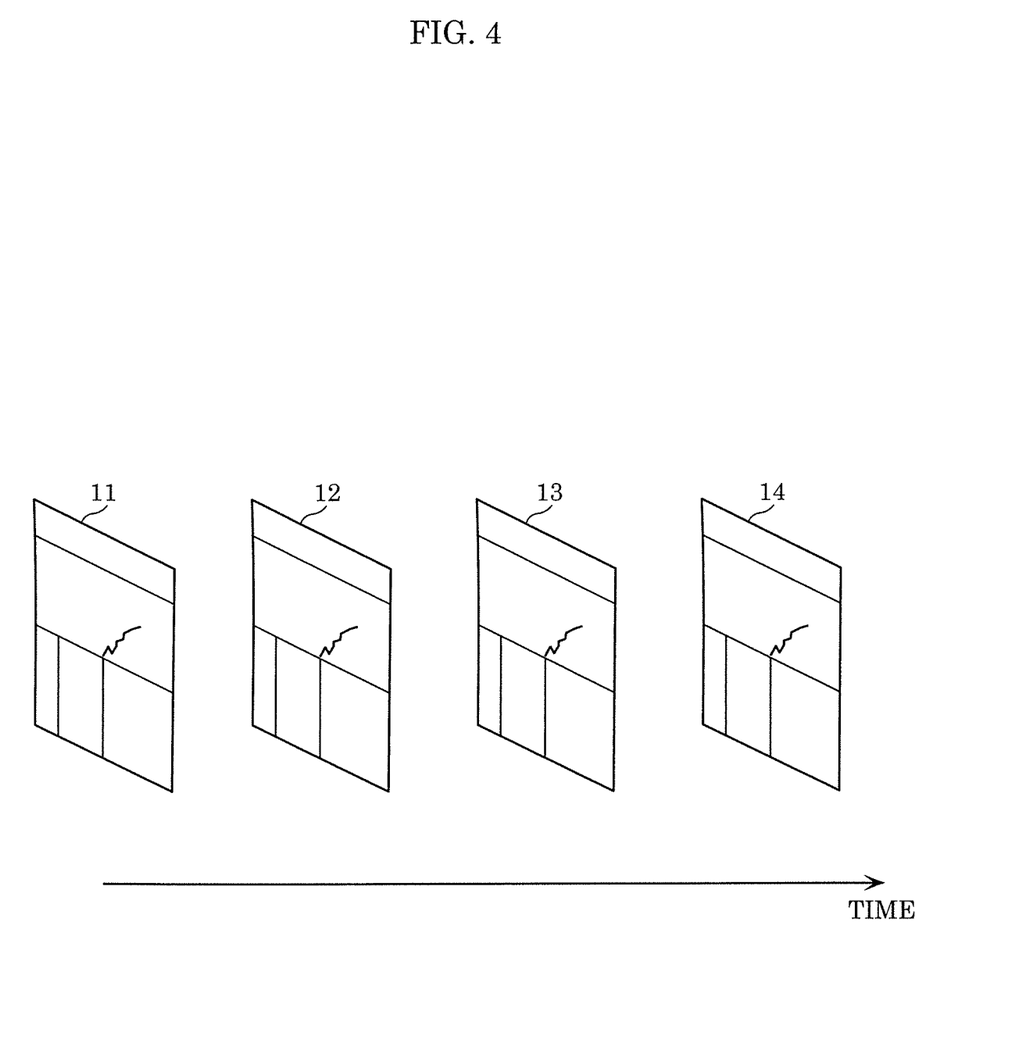
FIG. 4 is a diagram showing an exemplary plurality of images according to Embodiment 1.
Figure 5:
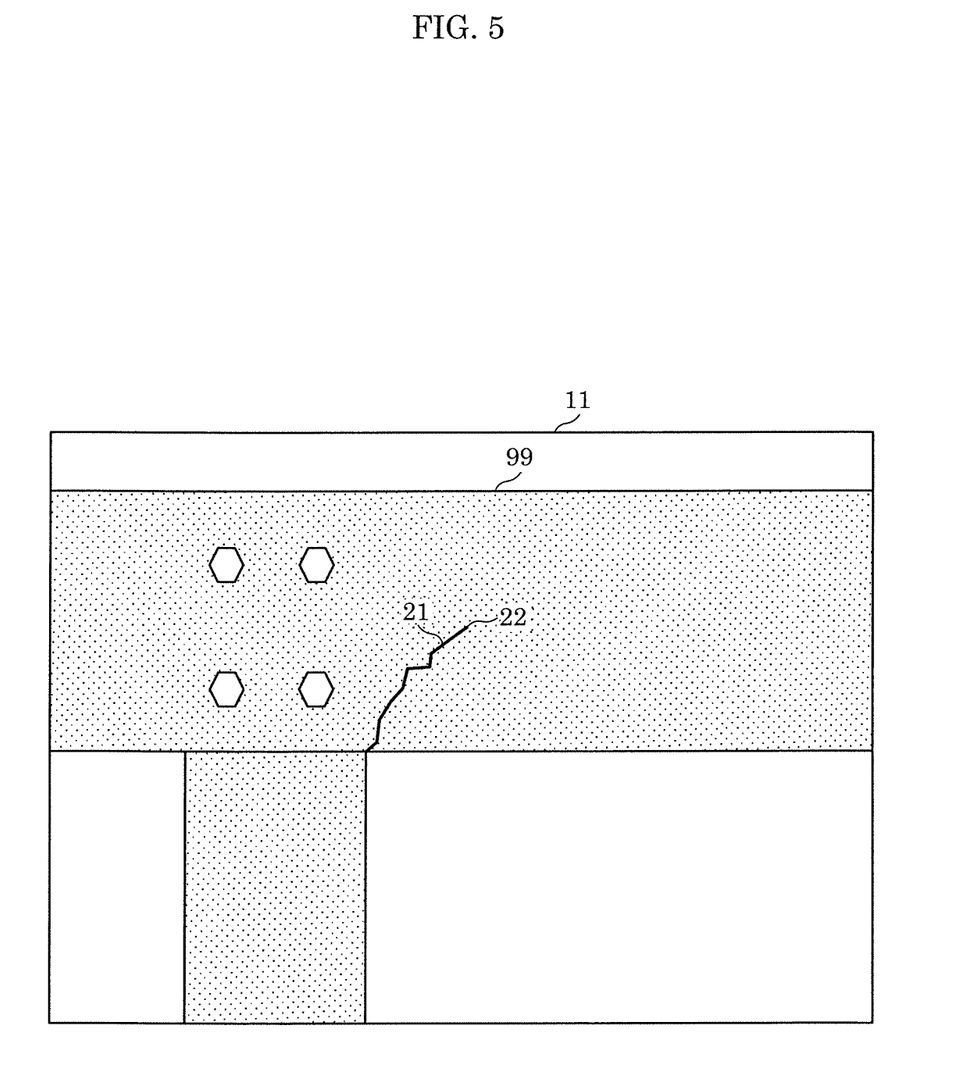
FIG. 5 is a diagram for explaining a crack included in an image according to Embodiment 1.
Figure 6:
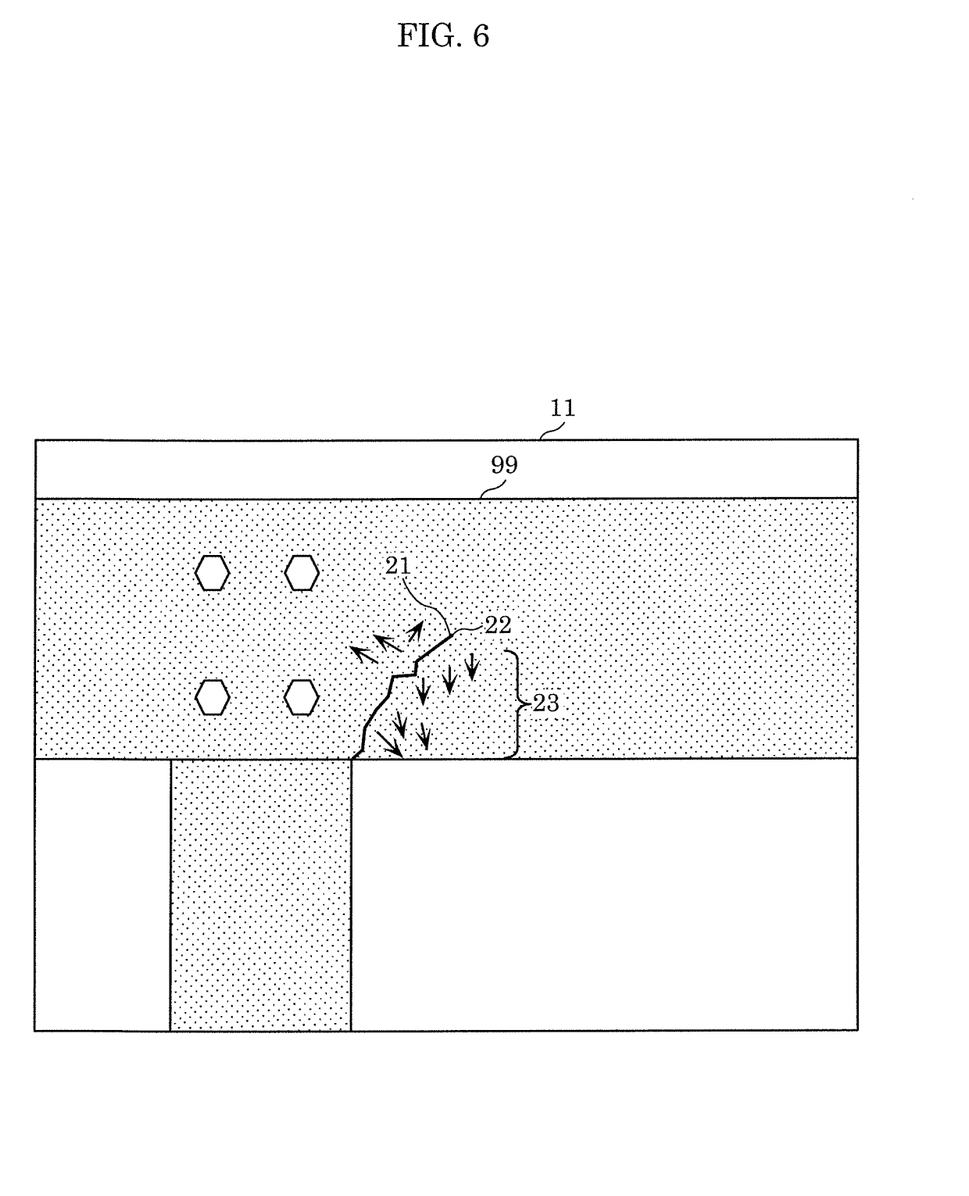
FIG. 6 is a diagram for explaining motion vectors of the surrounding area of the crack according to Embodiment 1.

First, with reference to FIG. 3 through FIG. 6, the following specifically describes an overview of the processes performed by the inspection device. FIG. 3 is a flowchart showing an overview of the processes performed by inspection device 120 according to Embodiment 1. FIG. 4 is a diagram showing an exemplary plurality of images according to Embodiment 1. FIG. 5 is a diagram for explaining a crack included in an image according to Embodiment 1. FIG. 6 is a diagram for explaining motion vectors of the surrounding area of the crack according to Embodiment 1.

First, obtainer 121 obtains a plurality of images of structure 99 captured by imaging device 110 (S101). As shown in FIG. 4, for example, obtainer 121 obtains images 11 through 14 that include an identical portion of the structure and captured at mutually different times.

Crack detector 122 detects a crack included in each of the plurality of images (S102). As shown in FIG. 5, for example, crack detector 122 detects crack 21 in image 11.

Motion estimator 123 derives motion vectors of each of the plurality of images by performing local motion estimation on the surface of structure 99, with the tip of the detected crack serving as a reference (S103). As shown in FIG. 6, for example, motion estimator 123 performs block matching between image 11 and image 12 to derive motion vectors 23, with tip 22 of crack 21 included in image 11 serving as the reference. More specifically, motion estimator 123 determines the coordinates of each pixel included in image 11 and image 12, with the tip of the crack serving as the origin point, and derives motion vectors 23 that are represented by the determined coordinates.

Inspector 124 determines the structure's safety on the basis of the difference between the motion vectors of the symmetric positions with respect to the crack (S104). Its detailed processes will be described with reference to FIG. 7.

Finally, inspector 124 outputs the determination result (S105). In so doing, inspector 124 shows the determination result on, for example a display (not illustrated). Alternatively, inspector 124 may send the determination result to, for example, another device such as a smartphone and a tablet computer.

[Details of Safety Determination Process]

Figure 7:
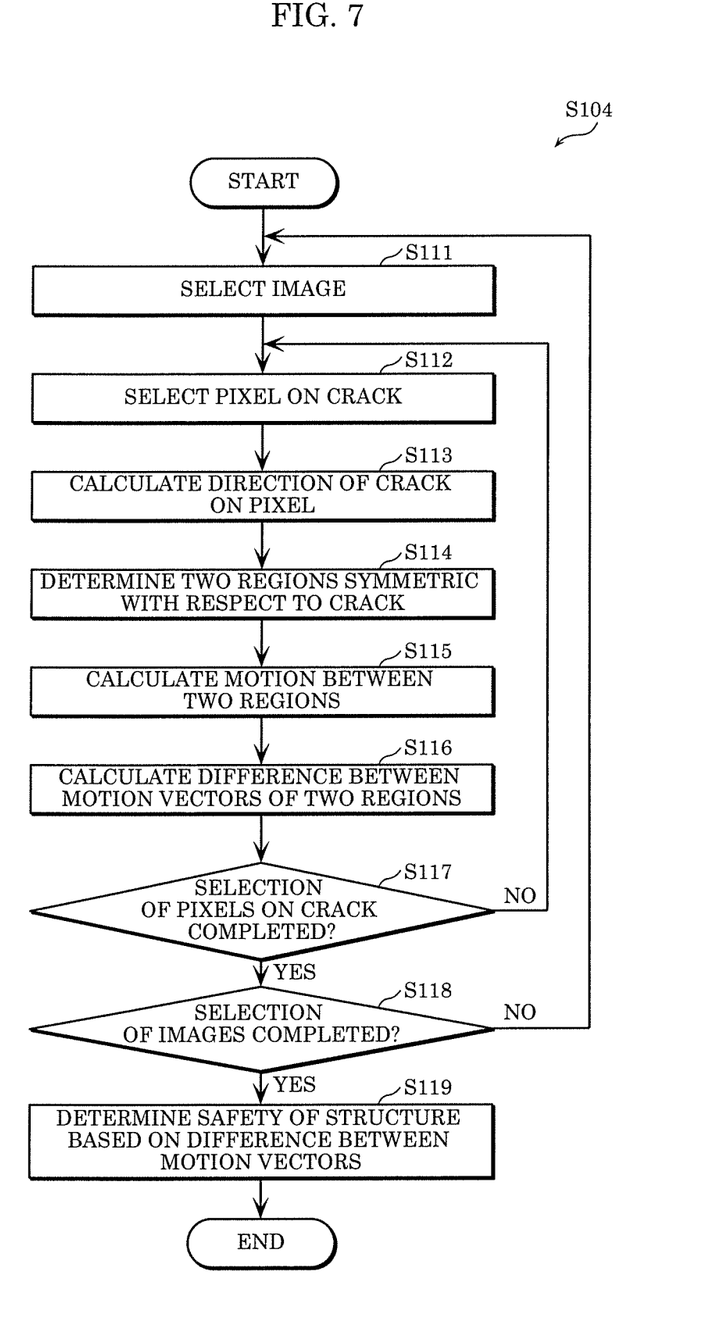
FIG. 7 is a flowchart of a safety determination process performed by the inspection device according to Embodiment 1.
Figure 8:
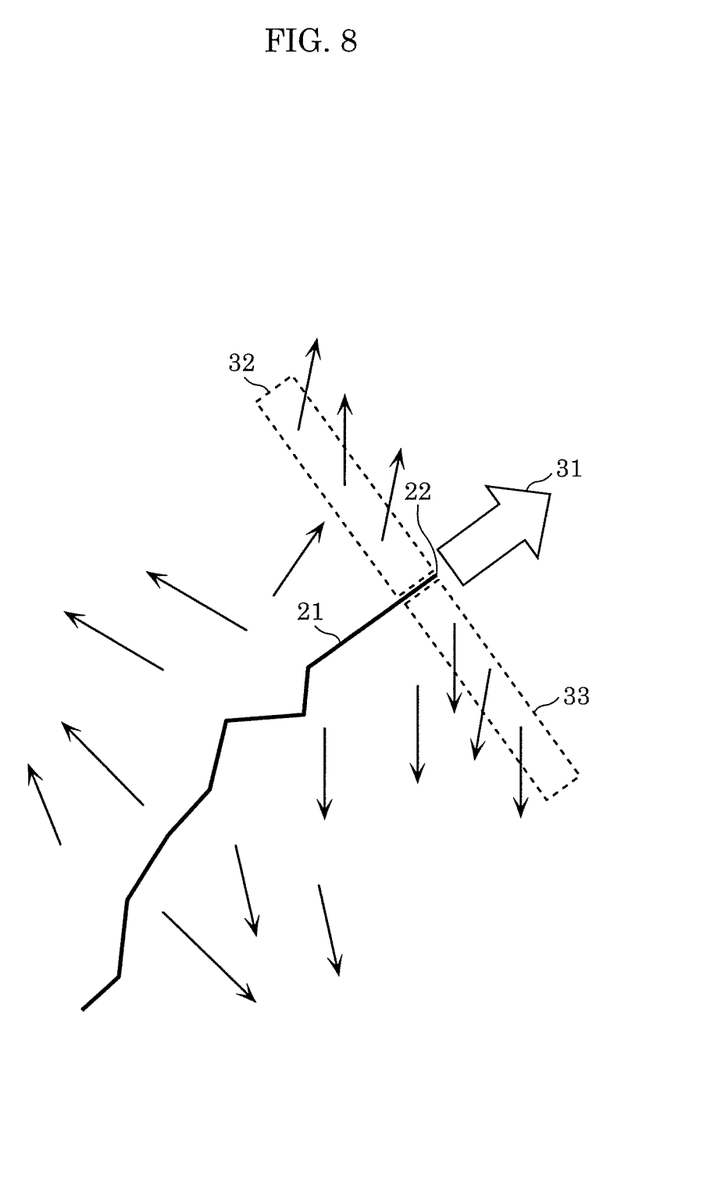
FIG. 8 is an enlarged view for explaining the safety determination process according to Embodiment 1.

With reference to FIG. 7, the following specifically describes the details of the process of determining the safety of structure 99 (Step S104 in FIG. 3). FIG. 7 is a flowchart of the safety determination process performed by inspection device 120 according to Embodiment 1. FIG. 8 is an enlarged view for explaining the safety determination process according to Embodiment 1.

First, inspector 124 selects an image which has not been selected, from among the plurality of images obtained (S111). For example, inspector 124 selects an image from among images 11 through 14 in FIG. 4 in chronological order (e.g., the first image 11).

Inspector 124 selects a pixel from among a plurality of pixels on the crack (S112). In FIG. 8, for example, inspector 124 sequentially selects pixels on crack 21, starting with the pixel on tip 22 of crack 21, in accordance with predetermined pixel spacing.

Inspector 124 calculates the direction of the crack for the selected pixel (S113). In FIG. 8, for example, inspector 124 calculates direction 31 of crack 21 on the basis of the selected pixel and its neighboring pixels on crack 21.

Inspector 124 determines two regions that are line-symmetric with respect to the line extending along the crack in the calculated direction (S114). In FIG. 8, for example, inspector 124 determines two regions 32 and 33 each having a predetermined size that are adjacent to the selected pixel at tip 22 of crack 21 and that are adjacent to each other in a direction perpendicular to direction 31 of crack 21. These two regions 32 and 33 are an example of the symmetric regions (positions) with respect to the crack.

Inspector 124 calculates the motion between the two regions 32 and 33 determined (S115). Inspector 124 then calculates the difference between the motion vectors of these two regions (S116). For example, inspector 124 calculates an arithmetic representative motion vector (e.g., average motion vector, maximum motion vector) of the motion vectors included in each of the two regions 32 and 33. Subsequently, inspector 124 calculates a differential motion vector between the representative motion vector of region 32 and the representative motion vector of region 33.

Inspector 124 determines whether the selection of pixels on the crack has completed (S117). When determining that the selection of pixels on the crack has not completed (No in S117), inspector 124 returns to step S112. Meanwhile, when determining that the selection of pixels on the crack has completed (Yes in S117), inspector 124 determines whether the selection of images has completed (S118). When determining that the selection of images has not completed (No in S118), inspector 124 returns to step S111. Meanwhile, when determining that the selection of images has completed (Yes in S118), inspector 124 determines the safety of structure 99 on the basis of the difference between the motion vectors calculated in step S115 (S119). For example, when the arithmetic representative value (e.g., mean value or median value) of the magnitudes of the differential motion vectors of images 11 through 13 is greater than a predetermined threshold, inspector 124 determines that the safety of structure 99 is low, and determines that the safety of structure 99 is high in the other case.

[Effect, Etc.]

As described above, inspection device 120 according to the present embodiment is capable of determining the structure's safety on the basis of the difference between the motion vectors of the symmetric positions with respect to the crack. The extension of a crack depends on the stress applied around the crack, especially the stress applied on the crack. The determination of the structure's safety on the basis of the difference between the motion vectors of the symmetric positions with respect to the crack enables a more accurate determination of degradation in the structure's safety caused by crack extension, thus improving the inspection accuracy. Also, inspection device 120 according to the present embodiment is further capable of determining the structure's safety from images, which eliminates the necessity of a visual inspection and thus reduces the time taken for the inspection.

Inspection device 120 according to the present embodiment is also capable of determining, as the symmetric positions with respect to the crack, positions that are line-symmetric with respect to the line that extends along the crack in the calculated direction of the crack. This enables the difference between the motion vectors of the positions that face each other across the crack in the direction perpendicular to the crack to be used for safety determination. Consequently, a more accurate determination is achieved on degradation in the structure's safety caused by crack extension.

Note that the present embodiment describes a non-limited example in which a differential motion vector is used as the difference between motion vectors. Components perpendicular to the direction of the crack may thus be extracted from motion vectors, for example, to use the differential value of the extracted components as the difference between motion vectors.

Also, a variation in the width of the crack may be estimated from the extracted components so that the structure's safety is determined on the basis of the estimated variation in the width. The variation in the width of the crack while the structure is subjected to varying loads greatly influences the extension of the crack, although such variation is small. However, such smallness makes it difficult for the variation to be derived directly from images. In view of this, the use of a variation in the width of the crack that has been estimated on the basis of the difference between the motion vectors of the symmetric positions with respect to the crack enables more accurate prediction of crack extension, thus improving the accuracy of inspecting the structure.

Embodiment 2

The following describes Embodiment 2. The present embodiment is different from Embodiment 1 described above in that, instead of using for the inspection the motion vectors obtained by local motion estimation as they are, Embodiment 2 uses for the inspection principal components of the motion vectors extracted by a principal component analysis. The following description of Embodiment 2 focuses on the differences from Embodiment 1 described above.

[Functional Structure of Inspection Device]

Figure 9:
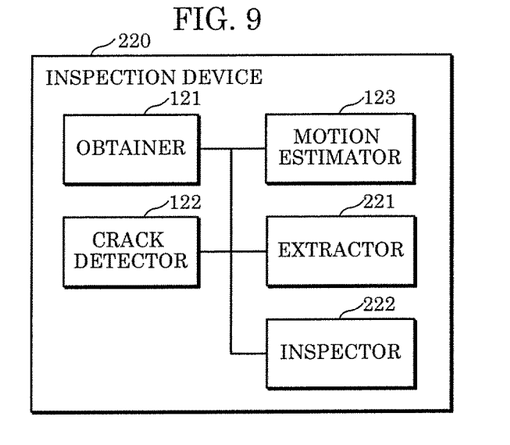
FIG. 9 is a block diagram of the functional structure of an inspection device according to Embodiment 2.

With reference to FIG. 9, the following describes the functional structure of inspection device 220 according to Embodiment 2. FIG. 9 is a block diagram of the functional structure of inspection device 220 according to Embodiment 2. As shown in FIG. 9, inspection device 220 includes obtainer 121, crack detector 122, motion estimator 123, extractor 221, and inspector 222.

Extractor 221 performs a principal component analysis (PCA) on a plurality of motion vectors to extract a plurality of principal components from the plurality of motion vectors.

Inspector 222 determines the structure's safety by use of the plurality of principal components extracted, excluding at least one bottom principal component in descending order of eigenvalue or contribution rate. Stated differently, inspector 222 determines the structure's safety by use of the top principal components in descending order of eigenvalue or contribution rate.

[Processes of Inspection Device]

Figure 10:
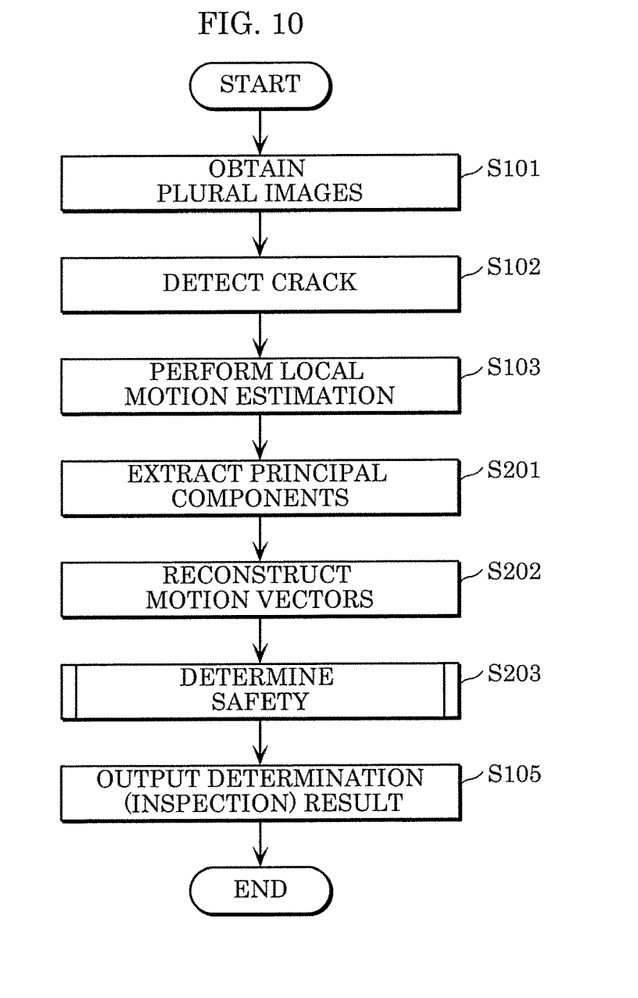
FIG. 10 is a flowchart showing an overview of processes performed by the inspection device according to Embodiment 2.

The following describes the processes performed by inspection device 220 with the above structure. FIG. 10 is a flowchart showing an overview of the processes performed by inspection device 220 according to Embodiment 2.

After the completion of step S101 through step S103, as in the case of Embodiment 1, extractor 221 performs a principal component analysis on a plurality of motion vectors to extract a plurality of principal components from the plurality of motion vectors (S201).

Extractor 221 uses the plurality of principal components extracted, excluding at least one bottom principal component in descending order of eigenvalue to reconstruct a plurality of motion vectors (S202). More specifically, extractor 221 extracts, from the plurality of principal components, top principal components having a greater cumulative contribution rate than a predetermined contribution rate threshold. Stated differently, extractor 221 removes the bottom principal component(s) from the plurality of principal components. Extractor 221 reconstructs a plurality of motion vectors, using the principal components obtained in the above manner.

Subsequently, inspector 222 determines the structure's safety using the plurality of motion vectors reconstructed (S203). Stated differently, inspector 222 uses the plurality of motion vectors reconstructed, instead of the plurality of motion vectors according to Embodiment 1, to determine the structure's safety.

[Effect, Etc.]

As described above, inspection device 220 according to the present embodiment is capable of determining the structure's safety, using the principal components, excluding at least one bottom principal component in descending order of eigenvalue. Inspection device 220 according to the present embodiment is thus capable of removing noise components from the motion vectors and thus further improving the accuracy of inspecting the structure.

Embodiment 3

The following describes Embodiment 3. The present embodiment is different from the embodiments described above in that Embodiment 3 inspects the structure on the basis of long-term changes in the crack, in addition to the difference between the motion vectors, representing short-time motion, of the regions at the symmetric positions with respect to the crack. The following description of Embodiment 3 focuses on the differences from Embodiment 1 described above.

[Functional Structure of Inspection Device]

Figure 11:
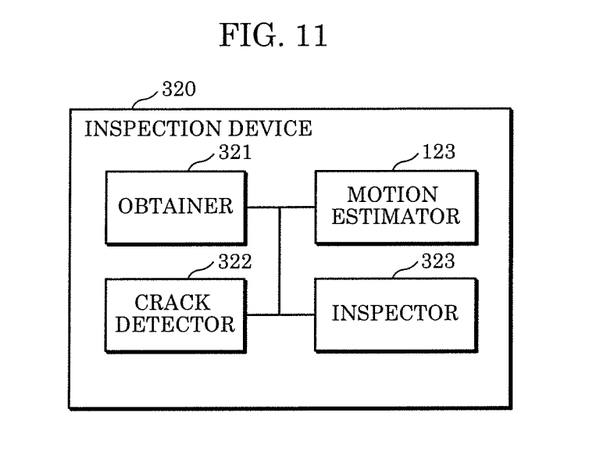
FIG. 11 is a block diagram of the functional structure of an inspection device according to Embodiment 3.

With reference to FIG. 11, the following describes the functional structure of inspection device 320 according to Embodiment 3. FIG. 11 is a block diagram of the functional structure of inspection device 320 according to Embodiment 3. As shown in FIG. 11, inspection device 320 includes obtainer 321, crack detector 322, motion estimator 123, and inspector 323.

In addition to the plurality of images of structure 99 captured at mutually different times while structure 99 is subjected to varying loads, obtainer 321 further obtains a reference image that is captured temporally before the plurality of images.

Crack detector 322 detects a crack on the surface of structure 99 included in the reference image, in addition to the crack included in each of the plurality of images.

Inspector 323 determines the structure's safety on the basis of a variation in the crack between the reference image and one of the plurality of images, in addition to the difference between the motion vectors of the regions at the symmetric positions with respect to the crack. More specifically, inspector 323 calculates the variation in the crack between the reference image and a selected one of the plurality of images (hereinafter referred to as selected image).

[Processes of Inspection Device]

Figure 12:
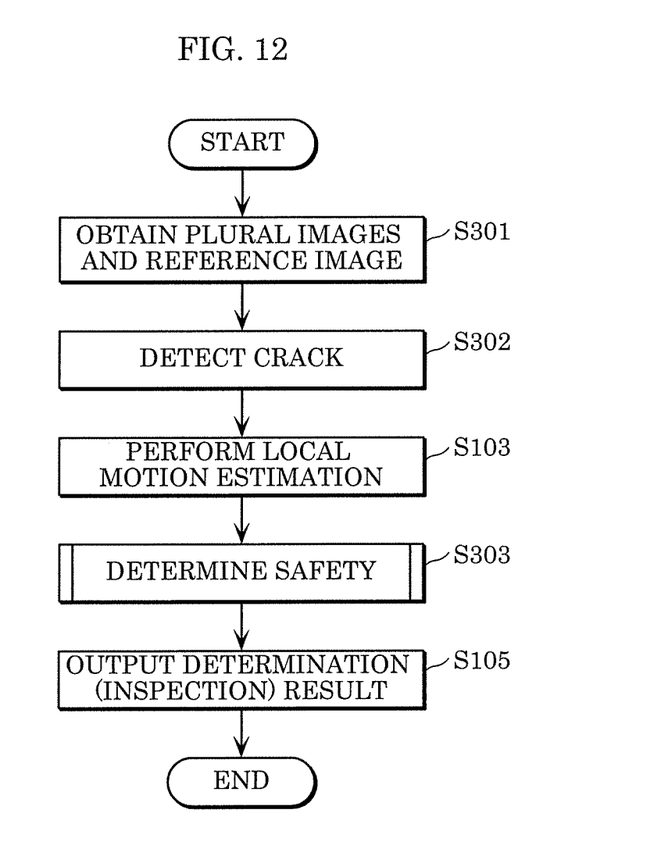
FIG. 12 is a flowchart showing an overview of processes performed by the inspection device according to Embodiment 3.

The following describes the processes performed by inspection device 320 with the above structure. FIG. 12 is a flowchart showing an overview of the processes performed by inspection device 320 according to Embodiment 3.

Figure 13:
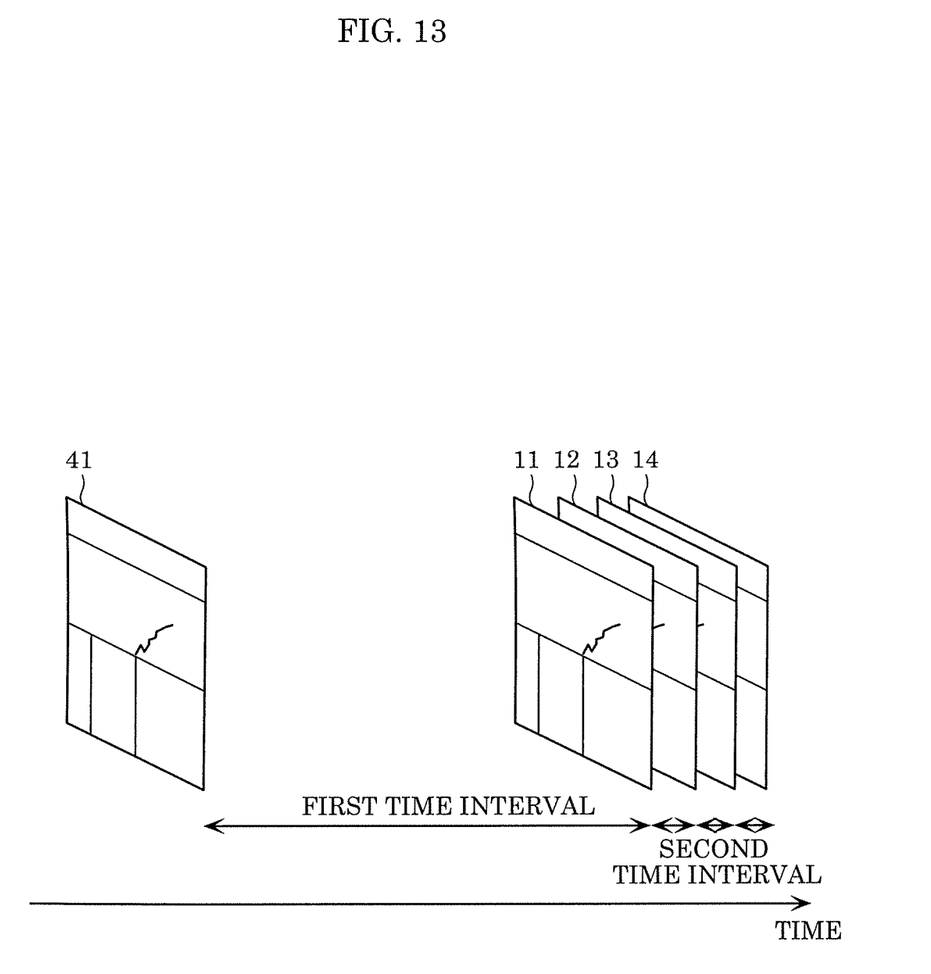
FIG. 13 is a diagram showing an exemplary reference image and an exemplary plurality of images according to Embodiment 3.

First, obtainer 321 obtains a plurality of images of structure 99 captured at mutually different times while structure 99 is subjected to varying loads and a reference image captured temporally before the plurality of images (S301). More specifically, as shown in FIG. 13, for example, obtainer 321 obtains reference image 41 and a plurality of images 11 through 14. Here, a first time interval between reference image 41 and the first image 11 of the plurality of images 11 through 14 is greater than a second time interval between the plurality of images.

The first time interval is a time interval at which physical changes in the crack such as crack extension are observed. Examples of the first time interval include one week, one month, and one year. Meanwhile, the second time interval is a time interval at which minute variations on the surface of the structure caused by varying loads are observed. Examples of the second time interval include $1/60$ seconds, $1/30$ seconds, and $1/15$ seconds.

Crack detector 322 detects a crack included in each of the plurality of images and the reference image (S302).

As in the case of Embodiment 1, motion estimator 123 derives motion vectors in each of the plurality of images by performing local motion estimation on the surface of structure 99, with the tip of the detected crack serving as a reference (S103).

Inspector 323 determines the structure's safety on the basis of the variation in the crack between the reference image and one of the plurality of images, in addition to the difference between the motion vectors of the regions at the symmetric positions with respect to the crack (S303).

Figure 14:
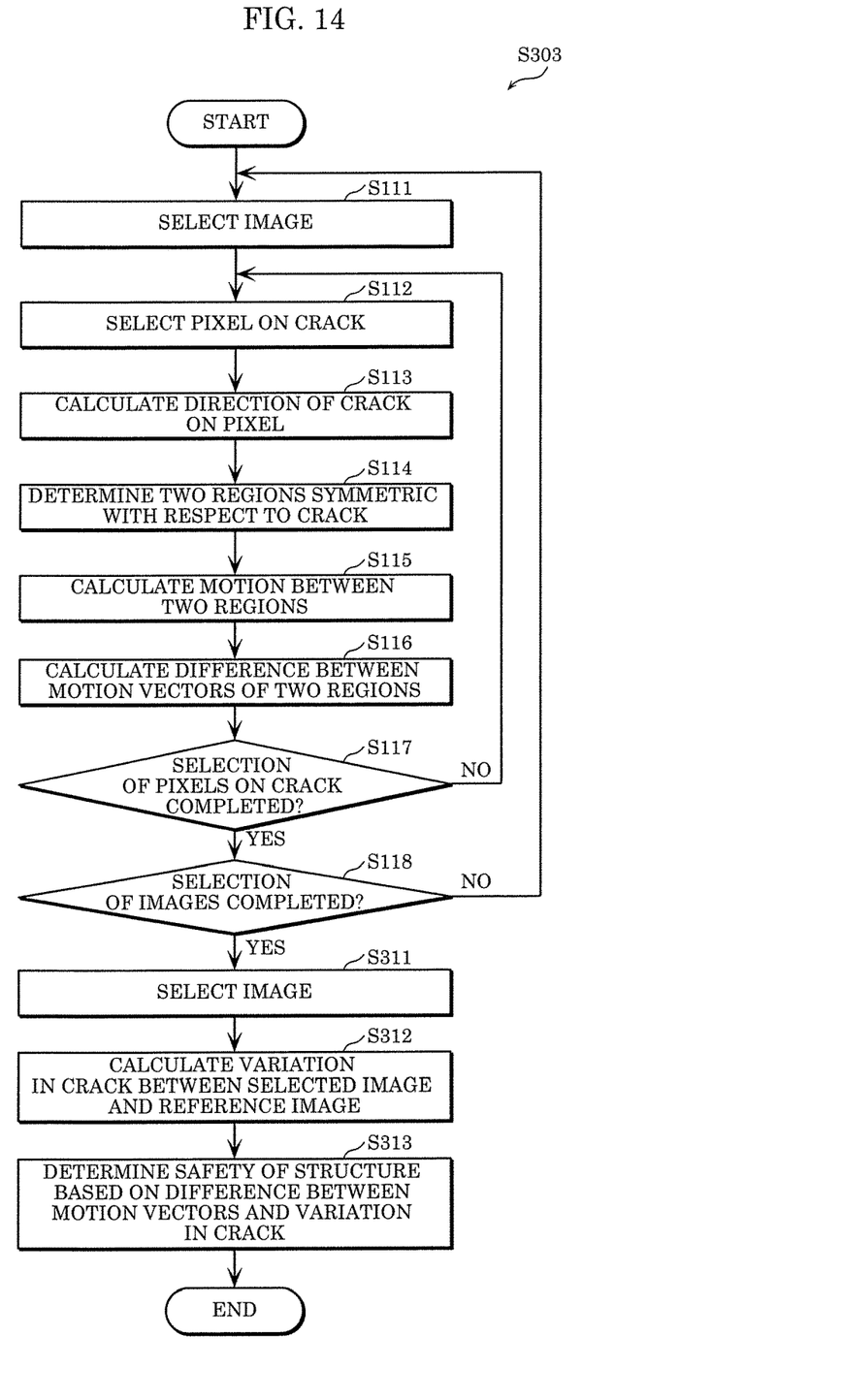
FIG. 14 is a flowchart showing a detailed safety determination process performed by the inspection device according to Embodiment 3.

With reference to FIG. 14, the following specifically describes step S303. FIG. 14 is a flowchart of a detailed safety determination process performed by inspection device 320 according to Embodiment 3.

When determining that the selection of images has completed (Yes in S118) after the completion of step S111 through step S118, as in the case of Embodiment 1, inspector 323 selects one of the plurality of image (S311). For example, inspector 323 selects the first image in chronological order from among the plurality of images. Alternatively, inspector 323 may select the last image in chronological order from among the plurality of images.

Inspector 323 calculates the variation in the crack between the selected image and the reference image (S312). More specifically, inspector 323 determines the coordinates of each pixel included in the reference image and the selected image, with a feature point other than the crack serving as the origin point, and calculates the variation by use of the determined coordinates. For example, when the coordinates of the pixel at the tip of the crack included in the reference image is (10, 10) and the coordinates of the pixel at the tip of the crack included in the selected image is (10, 25), the variation to be calculated is 15 pixels.

Inspector 323 determines the safety of structure 99 on the basis of the difference between the motion vectors calculated in step S115 and the variation in the crack calculated in step S312 (S313). For example, when the magnitude of the differential motion vector is greater than a predetermined threshold and the variation in the crack is greater than a predetermined variation threshold, inspector 323 determines that the safety of structure 99 is low, and determines that the safety of structure 99 is high in the other case.

[Effect, Etc.]

As described above, inspection device 320 according to the present embodiment is capable of determining the structure's safety on the basis of a variation in the crack between the reference image captured before the plurality of images and one of the plurality of images, in addition to the difference between the motion vectors. Consequently, inspection device 320 achieves more accurate prediction of crack extension, thus improving the accuracy of inspecting the structure.

Other Embodiments

The inspection device according to one or more aspects of the present disclosure has been described above on the basis of the embodiments, but the present disclosure is not limited to such embodiments. The scope of one or more aspects of the present disclosure also includes an embodiment achieved by combining structural components in different embodiments.

For example, the above embodiments describe an example of using two-dimensional images, but three-dimensional images may also be used. In this case, three-dimensional motion vectors are used to determine the structure's safety.

Although the inspection device in each of the above embodiments does not include an imaging device, the inspection device may include an imaging device. Also, a plurality of functional components included in the inspection device (obtainer, crack detector, motion estimator, inspector, etc.) may be implemented by distributed computing or cloud computing.

Also, the above embodiments describe an example of using block matching for motion estimation, but the present disclosure is not limited to this example. Motion estimation may thus be performed by matching between other local image features such as those of histogram of oriented gradients (HOG) and scaled invariance feature transform (SIFT).

Also, the above embodiments describe an example of using the difference between the representative motion vectors of the regions at the symmetric positions with respect to the crack as the difference between the motion vectors of the symmetric positions with respect to the crack, but the present disclosure is not limited to this example. The difference between motion vectors of individual positions may thus be used without using regions. Alternatively, the difference in time frequency components between the motion vectors of the symmetric positions with respect to the crack, for example, may be used.

Note that local motion estimation may not necessarily be performed on the entire image, and may thus be performed on a limited region. For example, local motion estimation may be performed only on the surrounding area of the crack. The surrounding area of the crack can be defined, for example, by the distance from the crack.

Also, the above embodiments calculate the direction of the crack for each of the pixels on the crack, but the present disclosure is not limited to this example. The direction of the crack may thus be calculated using only representative pixels on the crack. In this case, one direction is calculated for one crack, and regions at symmetric positions with respect to the crack are determined on the basis of the calculated direction.

Also, the above embodiments perform local motion estimation on the surface of the structure with the tip of the crack serving as a reference, but the present disclosure is not limited to using the tip of the crack. Another characteristic position (predetermined position) on the crack may thus be used as a reference point, instead of the tip of the crack. For example, a branch point, a folding point, and so forth of the crack may be used as a reference point for motion estimation.

One or more, or all of the structural components included in the inspection device according to each of the embodiments may be implemented as a single system large scale integration (LSI). For example, inspection device 120 may be implemented as a system LSI that includes obtainer 121, crack detector 122, motion estimator 123, and inspector 124.

The system LSI is a super-multifunctional LSI that is manufactured by integrating a plurality of components onto a single chip. The system LSI is more specifically a computer system that includes a microprocessor, a read only memory (ROM), a random access memory (RAM), and so forth. The ROM stores a computer program. The microprocessor operating in accordance with the computer program enables the system LSI to accomplish its function.

Although an LSI is described here as an example, the chip may also be referred to as an integrated circuit (IC), an LSI, a super LSI, or an ultra LSI, depending on the degree of integration. Also, a method of IC implementation is not limited to an LSI. Each of the structural components may thus be implemented as a dedicated circuit or a general-purpose processor. A field programmable gate array (FPGA) that allows for programming after the manufacture of an LSI, or a reconfigurable processor that allows for reconfiguration of the connection and settings of circuit cells inside an LSI may be employed.

Furthermore, when a new IC technology replaces LSI owing to the progress in the semiconductor technology or another derivative technology, such new technology may certainly be employed for the integration of the functional blocks. For example, the application of biotechnology is possible.

Also, an aspect of the present disclosure is not limited to such inspection device, and thus may be an inspection method that includes as its steps the characteristic components of the inspection device. An aspect of the present disclosure may also be a computer program that causes a computer to execute the characteristic steps included in the inspection method. An aspect of the present disclosure may further be a non-transitory, computer-readable recording medium storing such computer program.

Note that the structural components according to the embodiments may be implemented as dedicated hardware or may be implemented by executing a software program suited to each of the structural components. Alternatively, the structural components may be implemented by a program execution unit such as a CPU and a processor reading out and executing the software program recorded in a recording medium such as a hard disk or a semiconductor memory. Here, the software program that implements the inspection device and so forth according to the embodiments is a program as described below.

Stated differently, such program causes a computer to execute an inspection method of inspecting a structure with a crack. Such method includes: obtaining a plurality of images of the structure captured at mutually different times while the structure is subjected to varying loads; detecting a crack on a surface of the structure included in each of the plurality of images; performing local motion estimation on the surface of the structure with respect to a reference to derive motion vectors, the reference being a predetermined position in the crack detected in each of the plurality of images; and determining safety of the structure based on a difference between ones of the motion vectors of symmetric positions with respect to the crack.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable for use as an inspection device that inspects a structure to prevent degradation in the structure's safety caused by a crack.

What is claimed is:

1. An inspection device that inspects a structure with a crack, the inspection device comprising:
an obtainer that obtains a plurality of images of the structure captured at mutually different times while the structure is subjected to varying loads;
a crack detector that detects a crack on a surface of the structure included in each of the plurality of images;
a motion estimator that divides each of the plurality of images into a plurality of blocks each having a predetermined size, and derives motion vectors of the plurality of blocks based on a positional relation between a position of each of the plurality of blocks relative to a reference in a first image and a position of each of the plurality of blocks relative to the reference in a second image, the reference being a tip of the crack detected, the first image and the second image being included in the plurality of images; and
an inspector that determines safety of the structure based on a difference between ones of the motion vectors of symmetric positions with respect to the crack.

2. The inspection device according to claim 1, wherein the inspector:
selects a plurality of points on the crack that include the reference;
calculates a direction of the crack for each of the plurality of points; and
determines, as the symmetric positions with respect to the crack, line-symmetric positions with respect to a line that extends along the crack in the direction of the crack calculated.

3. The inspection device according to claim 1, wherein the inspector estimates a variation in a width of the crack based on the difference between the ones of the motion vectors, and determines the safety of the structure based on the variation in the width estimated.

4. The inspection device according to claim 1, further comprising:
an extractor that performs a principal component analysis on the motion vectors of the plurality of blocks derived to extract a plurality of principal components from the motion vectors, and
the inspector determines the safety of the structure, using the plurality of principal components extracted, excluding at least one bottom principal component in descending order of eigenvalue.

5. The inspection device according to claim 1,
wherein the obtainer further obtains a reference image captured temporally before the plurality of images,
the crack detector further detects a crack on the surface of the structure included in the reference image, and
the inspector further determines the safety of the structure based on a variation in the crack between the reference image and one of the plurality of images.

6. The inspection device according to claim 1, further comprising:
an image sensor that captures the plurality of images.

7. The inspection device according to claim 1,
wherein the inspector determines coordinates in each of the plurality of images with a feature point other than the crack serving as an origin point, calculates a variation in the crack based on the coordinates of the reference in the first image and the coordinates of the reference in the second image, and determines the safety of the structure based on the variation in the crack.

8. An inspection method of inspecting a structure with a crack, the inspection method comprising:
obtaining a plurality of images of the structure captured at mutually different times while the structure is subjected to varying loads;
detecting a crack on a surface of the structure included in each of the plurality of images;
dividing each of the plurality of images into a plurality of blocks each having a predetermined size;
deriving motion vectors of the plurality of blocks based on a positional relation between a position of each of the plurality of blocks relative to a reference in a first image and a position of each of the plurality of blocks relative to the reference in a second image, the reference being a tip of the crack detected, the first image and the second image being included in the plurality of images; and
determining safety of the structure based on a difference between ones of the motion vectors of symmetric positions with respect to the crack.

* * * * *